United States Patent [19]

Wagensonner

[11] 4,116,552

[45] Sep. 26, 1978

[54] MOTION-PICTURE CAMERA WITH AUTOMATIC DIAPHRAGM CONTROL COMPENSATED FOR SHUTTER-SPEED VARIATIONS

[75] Inventor: Eduard Wagensonner, Aschheim, Fed. Rep. of Germany

[73] Assignee: AGFA-Gevaert, A.G., Leverkusen, Fed. Rep. of Germany

[21] Appl. No.: 799,326

[22] Filed: May 23, 1977

[30] Foreign Application Priority Data

Jun. 26, 1976 [DE] Fed. Rep. of Germany ....... 2628843

[51] Int. Cl.$^2$ .............................................. G03B 7/08
[52] U.S. Cl. ...................................... 352/141; 354/44; 354/60 R
[58] Field of Search ................... 352/141; 354/40, 42, 354/43, 44, 51, 60 R

[56] References Cited

U.S. PATENT DOCUMENTS

| | | | |
|---|---|---|---|
| 3,840,295 | 10/1974 | Suzuki | 352/141 |
| 3,912,384 | 10/1975 | Wagensonner | 352/141 |
| 3,987,462 | 10/1976 | Wagensonner | 354/44 |
| 4,058,819 | 11/1976 | Rieder | 354/43 |

*Primary Examiner*—Russell E. Adams
*Attorney, Agent, or Firm*—Michael J. Striker

[57] ABSTRACT

A shutter mechanism alternates between an exposure phase and a reflex phase. In the reflex phase it reflects incident scene light onto a light-sensitive stage which generates a light-indicating signal. A first control pulse is generated at the start of the reflex phase, and a second control pulse at the end of the reflex phase. An integrating circuit receives the first pulse and during the reflex phase generates an integral signal dependent upon the time integral of the light-indicating signal. A signal-transmission switch is operative in response to the second pulse for transmitting the integral signal to a signal-storing stage. The signal from the signal-storing stage is used as the feedback signal to a negative-feedback control arrangement for the camera diaphragm. This feedback signal is dependent not only upon scene light but also the duration of the reflex phase. Accordingly, if the scene light remains constant but the speed of the motor driving the shutter is below or above rated speed, that is automatically compensated by a change in the feedback signal, so that the diaphragm setting takes into account the longer or shorter exposure times resulting from the shutter-motor speed deviation.

11 Claims, 1 Drawing Figure

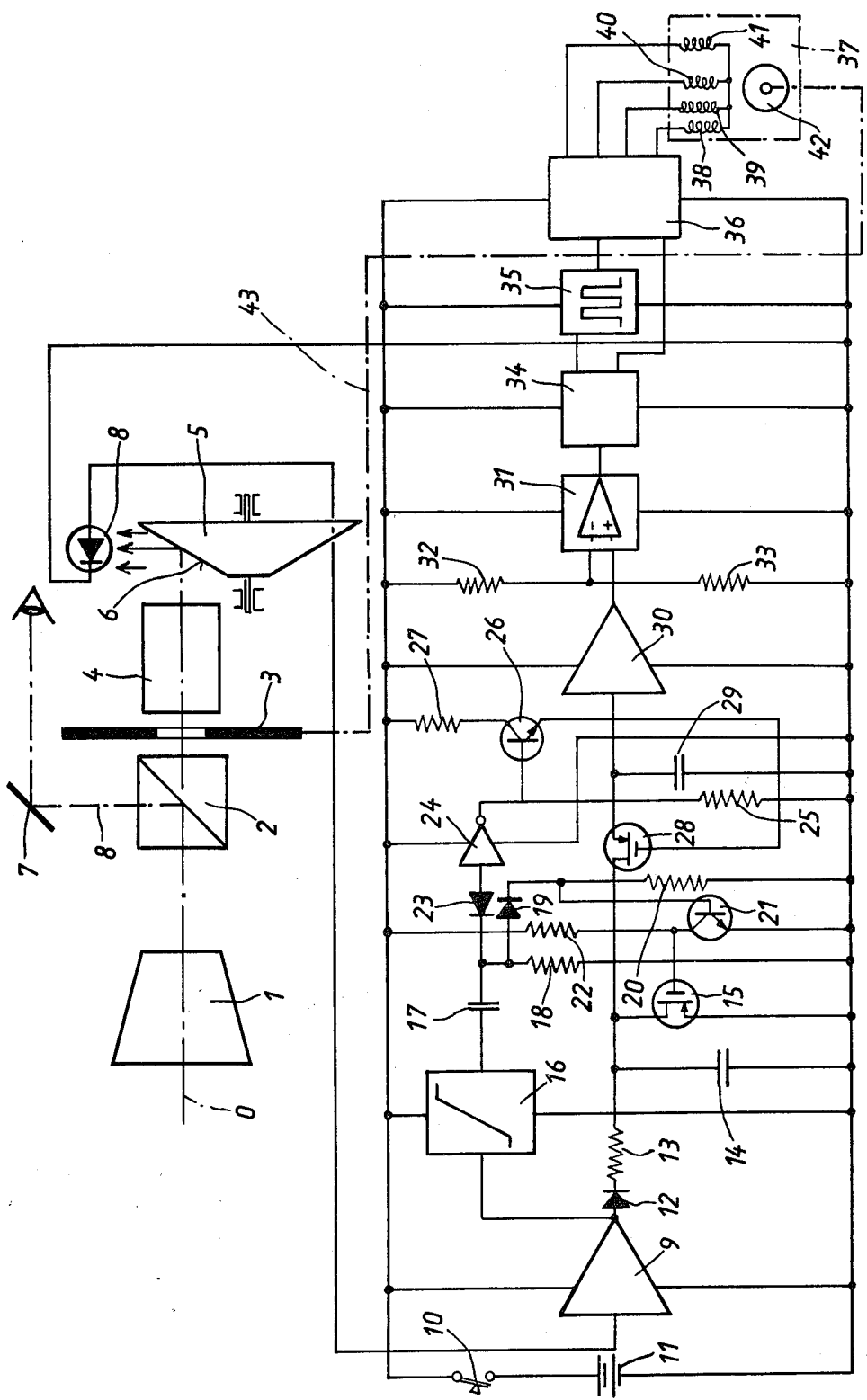

MOTION-PICTURE CAMERA WITH AUTOMATIC DIAPHRAGM CONTROL COMPENSATED FOR SHUTTER-SPEED VARIATIONS

BACKGROUND OF THE INVENTION

The present invention relates to motion-picture cameras utilizing a reflex shutter mechanism (usually a rotating shutter) which alternates between an exposure phase and a reflex phase. During the reflex phase, the shutter reflects scene light onto a light-sensitive means which furnishes a light-indicating signal. This signal is then used as a feedback signal for application to a negative-feedback diaphragm control arrangement.

With motion-picture cameras of the type in question, deviations of the shutter-motor speed from the rated speed value can cause improper exposure. If the shutter-motor speed is below rated speed, each exposure phase will be longer than the rated value. However, inasmuch as the light-indicating signal furnished to the negative-feedback diaphragm control arrangement is not dependent upon the duration of the exposure and reflex phases, the lengthened exposure phase is not taken into account in the automatic selection of the diaphragm setting. Thus, apart from undesirable effects resulting from the lowered shutter speed per se, there will be the additional problem that the exposed frames will tend to be overexposed. An analogous difficulty arises when the speed of the motor driving the shutter is above the rated value.

SUMMARY OF THE INVENTION

It is a general object of the invention to provide a motion-picture camera of the particular type in question with an improved negative-feedback diaphragm control system which automatically takes into account deviation of shutter-motor speed from rated value, when selecting the diaphragm setting.

According to one concept of the invention, this can be accomplished by making the feedback signal applied to the negative-feedback diaphragm control system dependent not only upon the scene-light level, but additionally upon the duration of the reflex phase. Thus, if the motor driving the shutter is operating below rated speed, both the duration of the exposure phase and also the duration of the reflex phase will be above the rated values. Because the light-dependent feedback signal of the invention is dependent upon the duration of the reflex phase, it will in such a situation have an increased value (simulating a scene light increase). As a result, the negative-feedback diaphragm control system will automatically set the diaphragm to a smaller aperture, compensating for the longer exposure time resulting from lower-than-rated shutter-motor speed.

In the preferred embodiment of the invention, a control-pulse generating circuit generates a first control pulse at the start of the reflex phase and a second control pulse at the end of the reflex phase. An integrating circuit receives both the light-indicating signal from the light-sensitive means and also the first control pulse. The integrating circuit, during the reflex phase, forms an integral signal dependent upon the time integral of the light-indicating signal. A signal-transmission means is operative in response to the second control pulse for transmitting the signal from the integrating circuit to a signal-storing circuit. The signal stored by the signal-storing circuit is used for generating the feedback signal to be applied to the negative-feedback diaphragm control means.

With the inventive system, if the speed of the motor driving the reflex shutter (for example a rotating reflex shutter) remains constant at rated speed, the duration of the reflex phase will have the rated value. In that event, the effect of integrating the light-indicating signal over the duration of the reflex phase will merely be to multiply the light-indicating signal by a constant. However, if the shutter-motor speed assumes a value lower than rated speed, the resulting lengthening of both the exposure phase and the reflex phase causes the integral of the light-indicating signal to increase. Accordingly, if the shutter-motor speed decreases below rated speed, then even if the scene light has not changed, the diaphragm aperture will automatically be made smaller, to compensate for the longer duration of the exposure phase, and thereby prevent overexposure.

It will be appreciated that the inventive compensation applies to at least two situations. The first is where the speed of operation of the motor driving the shutter mechanism fluctuates during operation. The second is where the speed of operation of the motor driving the shutter mechanism is constant during operation, but below or above rated speed.

In the preferred embodiment, the integrating circuit is comprised of an integrating capacitor, a charging diode through which the integrating capacitor charges and a semiconductor discharge switch connected across the integrating capacitor and rendered briefly conductive by the first control pulse, to discharge the integrating capacitor at the start of the reflex phase. Likewise, the signal-transmission means in the preferred embodiment is comprised of a semiconductor switch connecting the integrating capacitor to a storage capacitor in the signal-storing circuit. This switch is rendered briefly conductive by the second control pulse, to transfer charge from the integrating capacitor to the storage capacitor at the end of the reflex phase.

In the preferred embodiment, the light-sensitive means comprises a silicon diode and an amplifier connected in circuit with the diode, the output of the amplifier being connected to the charging diode for charging the integrating capacitor.

According to an alternative concept, the integrating circuit can be comprised not of just an integrating capacitor, but instead of a Miller integrator, i.e. an operational amplifier with a capacitor in its feedback branch.

In the preferred embodiment, the semiconductor switches mentioned above are field-effect transistors.

Advantageously, the signal-storing circuit comprises a storage capacitor connected in the input circuit of an impedance converter, whose output furnishes the actual feedback signal to the negative-feedback diaphragm control means.

Preferably, the control-pulse-generating circuit includes a threshold circuit whose input is connected to the output of the light-sensitive means. The threshold circuit shapes the leading and trailing ends of the light-indicating signal produced at the start and end of the reflex phase. Connected to the output of the threshold circuit is a differentiator which generates the first and second control pulses with opposite polarity in response to the leading and trailing ends of the shaped light-indicating signal. First and second diodes of opposite polarity are connected between the differentiator output and the control electrodes of the FET discharge switch and the FET signal-transmission switch, for rendering the former briefly conductive at the start of the reflex phase, and the latter briefly conductive at the end of the reflex phase.

In order to minimize voltage losses during the transmission of charge from the integrating capacitor to the storage capacitor at the end of the reflex phase, the capacitance of the integrating capacitor is at least one order of magnitude larger than (i.e., 10 times, 100 times, etc.) the capacitance of the storage capacitor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE depicts an exemplary embodiment of the invention.

DESCRIPTION OF THE PREFERRED EMBODIMENTS

In the FIGURE, only those components of a motion-picture camera are shown which are necessary for an understanding of the invention.

Located in the path 0 of the incoming light for the camera are a first objective unit 1, a deflecting prism 2, an adjustable diaphragm 3, a second objective unit 4 and a rotary reflex shutter 5 provided with a mirrored surface 6. Numeral 7 denotes a mirror which deflects a portion of the incoming light into the camera viewfinder (not illustrated).

The rotary reflex shutter 6 alternates between an exposure phase during which camera film is exposed and a reflex phase during which it reflects incoming light onto a silicon light-sensitive diode 8 connected in the input circuit of an amplifier 9. A switch 10 is closed to connect the camera battery 11 to the illustrated circuit. The output of amplifier 9 is connected via a charging diode 12 and a charging resistor 13 to an integrating capacitor 14. Connected across the integrating capacitor 14 is the main-electrode current path of a field-effect-transistor discharge switch 15.

The output of amplifier 9 is also connected to the input of a pulse-shaping threshold circuit 16. The pulse-shaping circuit 16 converts the light-indicating signal from amplifier 9 into a rectangular pulse whose steep leading and trailing ends respectively correspond to the start and end of the reflex phase. Connected to the output of pulse-shaping circuit 16 is a differentiator stage, here comprised of a differentiating capacitor 17 and a resistor 18. The output of the differentiator 17, 18 is connected to one terminal of a resistor 18 whose other terminal is connected to the negative battery terminal.

The anode of a diode 19 is connected to the output of differentiator 17, 18, and its cathode is connected to the negative battery terminal via a resistor 20 and also to the base of a transistor 21. Diode 19 transmits positive-going output pulses from the differentiator 17, 18. The collector of transistor 21, in turn, is connected to the control electrode of the field-effect-transistor discharge switch 15 and also to the negative battery terminal via a resistor 20.

The cathode of a further diode 23 is connected to the output of differentiator 17, 18, and its anode is connected to the input of an inverter 24. The output of inverter 24 is connected to a resistor 25 and to the base of a transistor 26. Diode 23 transmits negative-going output pulses from differentiator 17, 18.

The collector of transistor 26 is connected to the negative terminal of battery 11 via a resistor 27. The emitter of transistor 26 is connected to the control electrode of a field-effect-transistor signal-transmission switch 28, whose main-electrode current path connects the integrating capacitor 14 to a storage capacitor 29. Storage capacitor 29 is connected in the input circuit of an impedance converter 30.

The output of impedance converter 30 is connected to the non-inverting input of an operational amplifier 31, the inverting input of which is connected to the tap of a voltage divider 32, 33 operative for supplying to amplifier 31 a reference signal, for negative-feedback control.

Connected to the output of operational amplifier 31 is a threshold circuit 34 which receives the analog output signal from operational amplifier 31 and produces digital output signals in dependence thereon. The two outputs of stage 34 are used to determine whether and in what direction an adjusting motor 37 is to be energized. The upper output of stage 34 produces either a go-signal or a no-go signal for the motor, whereas the lower output of stage 34 produces either a signal commanding one motor direction or else a signal commanding the opposite motor direction.

The upper output of stage 34 is connected to a pulse-generating stage 35, whose output is connected to one input of a step-motor control circuit 36. The lower output of stage 34 is connected to the direction-control input of step-motor control circuit 36. The step motor proper is denoted by numeral 37. It includes four stator windings 38, 39, 40 and 41. The rotor 42 of the step motor 37 is coupled, via a linkage 43, to the adjustable diaphragm 3.

It is to be understood that the operational amplifier 31 receives at its inverting input a reference signal from reference voltage divider 32, 33. The non-inverting input of operational amplifier 31 receives a feedback signal dependent upon scene light. The signal at the output of operational amplifier 31 is dependent upon the discrepancy between its two input signals. If the diaphragm 3 is properly set, the output signal of amplifier 31 will have a null value (for example a voltage midway between the positive and negative battery-terminal voltages). This null-value voltage is applied to the threshold circuit 34. In response, threshold circuit 34 generates at its upper output a no-go signal. As a result, pulse generator 35 is not enabled for the application of energizing pulses to the step-motor control circuit 36.

If the difference between the two input signals to operational amplifier 31 has a first polarity (indicating that the diaphragm setting is improper in a first sense), the operational-amplifier output signal will become positive relative to the null value. If the magnitude of this positive output signal exceeds a predetermined magnitude, the threshold circuit 34 will recognize that diaphragm correction is necessary in a first direction, and it will generate on its upper output a go-signal and on its lower output a first direction signal, indicating the required correction direction.

If the difference between the two input signals to operational amplifier 31 has a second polarity (indicating that the diaphragm setting is improper in a second sense), the operational-amplifier output signal will become negative relative to the null value. If this negative output signal becomes more negative than a predetermined level, the threshold circuit 34 will recognize that diaphragm correction is necessary in the second direction, and it will generate on its upper output a go-signal and on its lower output a second direction signal, indicating the required correction direction.

In response to either one of these two conditions, the step-motor control circuit 36 applies the pulses from pulse generator 35 to the stator windings 38, 39, 40, 41 in either one or the opposite sequence, to cause the rotor 42 to rotate in one or the other direction.

Typically, the threshold circuit 34 will have a certain dead band. Accordingly, if the operational-amplifier output signal is only slightly more positive than the null value or else only slightly more negative than the null valve, then, to avoid hunting, the threshold circuit will not produce a go-signal on its upper output, and the pulse generator 35 will not be enabled for transmission of energizing pulses to the step-motor control circuit 36.

Components 31–37 and their operation are conventional.

What is novel is the manner in which the feedback signal applied to the non-inverting input of operational amplifier 31 is generated. This is discussed as follows:

During the reflex phase of rotary reflex shutter 5, the light-sensitive silicon diode 8 applies to the input of amplifier 9 a generally trapezoidal voltage (a pulse having non-vertical leading and trailing flanks). This trapezoidal voltage is converted by pulse-shaping circuit 16 into a rectangular pulse, which in turn is differentiated by differentiator 17, 18 to produce positive-going and negative-going control pulses, corresponding to the start of the reflex phase and the end of the reflex phase, respectively.

During the reflex phase, the trapezoidal light-indicating signal is integrated by integrating capacitor 14. During the reflex phase, the charging diode 12 prevents the discharging of capacitor 14. The positive-going control pulse generated at the start of the reflex phase renders transistor 21 briefly conductive. As a result, FET discharge switch 15 becomes briefly conductive and discharges integrating capacitor 14. This assures that the integrating capacitor 14 will always be discharged at the start of the reflex phase.

The negative-going control pulse generated at the end of the reflex phase is transmitted by diode 23 to inverter 24 and converted into a positive-going control pulse, which is then applied to the base of transistor 26. As a result, normally conductive transistor 26 becomes briefly non-conductive. This causes the normally non-conductive FET signal-transmission switch 28 to become briefly conductive. As a result, the charge accumulated upon integrating capacitor 14 during the course of the reflex phase is transferred to the storage capacitor 29, for storage during the subsequent exposure phase.

The voltage across capacitor 29 during the exposure phase (corresponding to the charge stored therein) is applied via the impedance converter 30 to the non-inverting input of operational amplifier 31, to serve as the feedback signal for the automatic diaphragm control system. Depending upon the sense and magnitude of the discrepancy between the two input signals to operational amplifier 31, the negative-feedback control components cause the motor 37 to remain unenergized, or to become energized in one or the opposite sense, as described above.

During steady-state operation (i.e., with the scene-light level constant, and with the speed of operation of shutter 5 constant), the diaphragm control system will be in balance. The voltage across storage capacitor 29 will be such that the output voltage of impedance converter 30 equals the reference voltage at the tap of reference voltage divider 32, 33, so that the output voltage of operational amplifier 31 will have the null value. In the steady state, during the course of one operating cycle (the exposure phase and the next-following reflex phase) storage capacitor 29 does not receive charge from integrating capacitor 14, but instead slowly discharges into the input circuit of impedance converter 30, acting as a current source. However, the amount of charge thusly lost by storage capacitor 29 during the course of the exposure phase and the subsequent reflex phase is replenished from integrating capacitor 14 at the end of the reflex phase. Accordingly, in the steady state, the voltage across storage capacitor 29 will fluctuate to so small an extent that resultant fluctuations in the output signal of operational amplifier 31 will have no effect upon threshold circuit 34.

However, if equilibrium is lost because the scene light level increases or decreases, then the amount of charge transferred from integrating capacitor 14 to storage capacitor 29 at the end of each reflex phase will be greater or less than the amount of charge which storage capacitor is losing into the input circuit of impedance converter 30 during each operating cycle. As a result, the average value of the slightly fluctuating voltage across storage capacitor 29 will either increase or decrease. This results in a discrepancy between the two input signals to operational amplifier 31 of such a magnitude as to cause the threshold circuit 34 to activate motor 37 in one or the other direction, as required. When the motor 37 then corrects the diaphragm setting in the required sense, equilibrium will be restored; i.e. a new steady state will be reached, wherein again the amount of charge transferred from capacitor 14 to capacitor 29 at the end of the reflex phase exactly replenishes the amount of charge lost by capacitor 29 into the impedance converter 30 during the operating cycle.

If the scene-light level remains constant, but the speed of operation of shutter 5 decreases (for example due to a speed drop of the motor driving shutter 5), then the durations of both the exposure phase and the reflex phase will increase correspondingly. As a result, the light-indicating signal from amplifier 9 will be integrated by capacitor 14 during the course of a now longer reflex phase. At the end of this longer reflex phase, the amount of charge transferred from capacitor 14 to capacitor 29 will exceed the amount of charge lost by capacitor 29 into impedance converter 30 during the operating cycle. Consequently, the diaphragm will be automatically readjusted until system equilibrium is again achieved, thereby preventing overexposure during the lengthened exposure phases. A similar automatic compensation will occur if the speed of operation of the shutter should increase, instead of decrease.

It will be appreciated that this speed-dependent automatic adjustment of the diaphragm 3 is applicable both to the situation where the speed of operation of the shutter fluctuates about the rated value, and also the situation where the speed of operation of the shutter remains constant above or below the rated value. Indeed, with the illustrated automatic diaphragm control system, even deliberate shutter speed changes (e.g., a selection of a lower or higher frame-repetition frequency for special effects) will be automatically taken into account by the diaphragm control system, to prevent underexposure and overexposure.

It will be understood that each of the elements described above, or two or more together, may also find a useful application in other types of circuits and constructions differing from the types described above.

While the invention has been illustrated and described as embodied in a negative-feedback diaphragm control system of a particular type in a motion-picture camera of a particular type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion-picture camera of the type including an adjustable diaphragm, light-sensitive means for generating a light-indicating signal, and a shutter mechanism which alternately assumes an exposure-phase setting for effecting film exposure and a reflex-phase setting for reflecting incident scene light onto the light-sensitive means, in combination therewith, a novel automatic diaphragm adjustment arrangement comprising control-pulse-generating means operative for generating a first control pulse at the start of the reflex phase and a second control pulse at the end of the reflex phase; integrating means receiving the light-indicating signal and the first control pulse and operative in response to the latter for generating during the reflex phase an integral signal dependent upon the time integral of the light-indicating signal; signal-storing means; signal-transmitting means connecting the signal-storing means to the integrating means and receiving the second control pulse and operative in response to the latter for transmitting the integral signal from the integrating means to the signal-storing means; adjusting means for adjusting the diaphragm; and negative-feedback control means connected to the signal-storing means and to the adjusting means and operative for controlling the operation of the adjusting means as a function of the difference between the signal stored by the signal-storing means and a predetermined reference signal.

2. In a camera as defined in claim 1, the integrating means including semiconductor means operative during the course of the reflex phase for preventing improper lowering of the integral signal being generated by the integrating means.

3. In a camera as defined in claim 1, the integrating means including semiconductor switch means connected to receive the first control pulse and operative in response thereto for discharging the integrating means.

4. In a camera as defined in claim 2, the light-sensitive means including a silicon diode and an amplifier connected in circuit with the diode for furnishing the light-indicating signal, the integrating means comprising an integrating capacitor operative for integrating the light-indicating signal, the semiconductor means comprising a charging diode connected between the output of the amplifier and the integrating capacitor for permitting capacitor charging while preventing capacitor discharging.

5. In a camera as defined in claim 1, the integrating means comprising a Miller integrator.

6. In a camera as defined in claim 3, the integrating means comprising an integrating capacitor, the semiconductor switch means comprising a field-effect transistor connected across the integrating capacitor and rendered briefly conductive by the first control pulse for discharging the integrating capacitor.

7. In a camera as defined in claim 1, the signal-storing means comprising a storage capacitor and an impedance converter in whose input circuit the storage capacitor is connected, the output of the impedance converter being connected to the negative-feedback control means.

8. In a camera as defined in claim 7, the integrating means comprising an integrating capacitor operative for integrating the light-indicating signal, the signal-transmitting means comprising a field-effect transistor connecting the storage capacitor to the integrating capacitor, the field-effect transistor being rendered briefly conductive by the second control pulse for transmitting charge from the integrating capacitor to the storage capacitor.

9. In a camera as defined in claim 1, the control-pulse-generating means comprising a differentiator having an input connected to the output of the light-sensitive means and operative in response to the increase in light incident upon the light-sensitive means at the start of the reflex phase for generating the first control pulse with one polarity, and operative in response to the decrease in light incident upon the light-sensitive means at the end of the reflex phase for generating the second control pulse with an opposite polarity, a first diode connected with one polarity between the differentiator output and the integrating means for furnishing to the latter the first control pulse, a second diode connected with opposite polarity between the differentiator output and the signal-transmitting means for furnishing to the latter the second control pulse.

10. In a camera as defined in claim 1, the integrating means comprising an integrating capacitor operative for integrating the light-indicating signal, the signal-storing means comprising a storage capacitor, the signal-transmitting means comprising switch means connecting the one capacitor to the other and briefly rendered conductive by the second control pulse for transmitting charge from the integrating capacitor to the storage capacitor, the capacitance of the integrating capacitor being at least one order of magnitude greater than the capacitance of the storage capacitor, whereby when the switch means is rendered conductive the charge on the integrating capacitor will be quickly and substantially transferred to the storage capacitor.

11. In a motion-picture camera as defined in claim 1, the light-sensitive means including a light-sensitive element and an amplifier connected in circuit with the light-sensitive element for furnishing the light-indicating signal, the integrating means including an integrating capacitor, a charging diode connecting the output of the amplifier to the integrating capacitor for transmitting the light-indicating signal to the capacitor, and a field-effect-transistor discharge switch connected across the integrating capacitor, the signal-storing means including a storage capacitor and an impedance converter having an input circuit in which the storage capacitor is connected and an output connected to the negative-feedback control means, the signal-transmitting means comprising a field-effect-transistor signal-transmission switch connecting the integrating capacitor to the storage capacitor, the control-pulse generating means comprising a differentiator having an input connected to the output of the amplifier of the light-sensitive means and operative in response to the increase in light incident upon the light-sensitive element at the start of the reflex phase for generating the first control pulse with one polarity, and operative in response to the decrease in light incident upon the light-sensitive element at the end of the reflex phase for generating the second control pulse with an opposite polarity, a first diode connected with one polarity between the differentiator output and the control electrode of the field-effect-transistor discharge switch for transmitting to the control electrode of the latter the first control pulse to briefly render the discharge switch conductive and discharge the integrating capacitor, and a second diode connected with the opposite polarity between the differentiator output and the control electrode of the field-effect-transistor signal-transmission switch for transmitting to the control electrode of the latter the second control pulse to briefly render the signal-transmission switch conductive and effect transfer of charge from the integrating capacitor to the storage capacitor.

* * * * *